(12) United States Patent
Chung et al.

(10) Patent No.: US 7,808,996 B2
(45) Date of Patent: Oct. 5, 2010

(54) PACKET FORWARDING APPARATUS AND METHOD FOR VIRTUALIZATION SWITCH

(75) Inventors: Yi-Cheng Chung, Penghu (TW); Stanley Lee, Tainan (TW); Yan-Hong Chiang, Tainan (TW); Chi-Chun Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 191 days.

(21) Appl. No.: 12/144,632

(22) Filed: Jun. 24, 2008

(65) Prior Publication Data

US 2009/0154472 A1 Jun. 18, 2009

(30) Foreign Application Priority Data

Dec. 18, 2007 (TW) ............................. 96148427 A

(51) Int. Cl.
*H04L 12/28* (2006.01)
*H04L 12/56* (2006.01)
(52) U.S. Cl. ............... 370/392; 370/352; 370/359; 370/397; 711/202; 711/203
(58) Field of Classification Search ........... 370/253, 370/352, 359, 363, 368, 392, 397; 709/201, 709/238; 710/22, 23, 24; 711/6, 100, 111, 711/155, 202, 203, 205–207, 22, 23, 24
See application file for complete search history.

(56) References Cited

U.S. PATENT DOCUMENTS

| | | | |
|---|---|---|---|
| 6,804,741 B2 * | 10/2004 | Cowan | 710/311 |
| 6,845,403 B2 * | 1/2005 | Chadalapaka | 710/5 |
| 6,934,799 B2 * | 8/2005 | Acharya et al. | 711/112 |
| 7,089,293 B2 * | 8/2006 | Grosner et al. | 709/217 |
| 7,165,258 B1 * | 1/2007 | Kuik et al. | 719/326 |
| 7,185,062 B2 * | 2/2007 | Lolayekar et al. | 709/213 |
| 7,302,500 B2 * | 11/2007 | Powell et al. | 710/5 |
| 7,376,765 B2 * | 5/2008 | Rangan et al. | 710/38 |
| 7,386,622 B2 * | 6/2008 | Tanaka | 709/230 |
| 7,415,535 B1 * | 8/2008 | Kuik et al. | 709/245 |
| 7,433,952 B1 * | 10/2008 | Woodruff | 709/226 |
| 7,437,477 B2 * | 10/2008 | Kuik et al. | 709/238 |
| 7,460,473 B1 * | 12/2008 | Kodama et al. | 370/230 |

(Continued)

OTHER PUBLICATIONS

"A packet Forwarding Method for the ISCSI Virtualization Switch"; Yi-Cheng Chung, Lee, S., Chung-Ho Chen; Storage Network Architecture and Parallel I/Os, 2007. SNAPI.International Workshop; Sep. 24, 2007.*

(Continued)

*Primary Examiner*—Aung S Moe
*Assistant Examiner*—Benjamin Elliott

(57) ABSTRACT

Disclosed is a packet forwarding apparatus and method for a virtualization switch, applicable to switch environments built by Internet Small Computer System Interface (iSCSI) connections. The packet forwarding apparatus comprises a header extractor, a dispatcher, and a forwarding unit. After completion of the authorization for iSCSI session connections, the header extractor receives iSCSI packets and extracts the headers for the iSCSI packets. The dispatcher decides the flow directions for the received packets. The forwarding unit forwards the packets between the client-side connection and the storage-side connection of the virtualization switch, including converting virtual addresses into physical addresses for the received iSCSI packets, building the mapping between the client-side interface and the storage-side interface, and delivering the payload associated with the connections.

19 Claims, 17 Drawing Sheets

U.S. PATENT DOCUMENTS

| | | | |
|---|---|---|---|
| 7,475,153 B2 * | 1/2009 | Hufferd | 709/230 |
| 7,526,527 B1 * | 4/2009 | Woodruff | 709/212 |
| 7,555,586 B2 * | 6/2009 | Powell et al. | 710/300 |
| 7,617,365 B2 * | 11/2009 | Zhang et al. | 711/141 |
| 2003/0058870 A1 * | 3/2003 | Mizrachi et al. | 370/395.52 |
| 2003/0086422 A1 * | 5/2003 | Klinker et al. | 370/389 |
| 2004/0049603 A1 * | 3/2004 | Boyd et al. | 710/1 |
| 2005/0044162 A1 * | 2/2005 | Liang et al. | 709/212 |
| 2005/0114464 A1 * | 5/2005 | Amir et al. | 709/213 |
| 2005/0138184 A1 * | 6/2005 | Amir | 709/228 |
| 2005/0281261 A1 * | 12/2005 | Zur et al. | 370/389 |
| 2006/0248292 A1 * | 11/2006 | Suresh | 711/154 |
| 2008/0229040 A1 * | 9/2008 | Honma | 711/162 |
| 2009/0154472 A1 * | 6/2009 | Chung et al. | 370/397 |

OTHER PUBLICATIONS

RFC 3720: "Internet Small Computer Systems Interface (iSCSI)"; Satran et al.; Apr. 2004; ftp://ftp.rfc-editor.org/in-notes/rfc3720.txt.*

* cited by examiner

PACKET FORWARDING APPARATUS AND METHOD FOR VIRTUALIZATION SWITCH

FIELD OF THE INVENTION

The present invention generally relates to a packet forwarding apparatus and method for a virtualization switch, applicable to switch environments built by Internet Small Computer System Interface (iSCSI) connections.

BACKGROUND OF THE INVENTION

The networked storage device is one of the trends of Internet development, and iSCSI transmission protocol is a new network storage technology standard. Storage area network (SAN) is a network connecting storage devices and servers; i.e., using network to connect storage devices. Compared to technologies, such as, the Redundant Array of Independent Disks (RAID) and Small Computer System Interface (SCSI) that directly connect storage devices and servers, the network storage technology has the advantages of high speed transmission, high scalability and high reliability as the expansion and the backup of the storage devices are not restricted by the server.

Because of the high demands on the bandwidth, fiber channel is the connection technology commonly used for storage network currently. Another uprising storage network technology is the recently standardized iSCSI transmission protocol. iSCSI transmission protocol is to use the iSCSI Protocol Data Unit (PDU) to transmit SCSI instruction and data on IP network. Therefore, through iSCSI protocol, IP network may also become storage network. For the client-side, to use IP network as storage network, it only requires to replace the interfaces of the servers and the storage devices with iSCSI interfaces so that the switches of the original IP network may be used to construct a storage network.

FIG. 1 shows an exemplary schematic view of a typical iSCSI virtual storage network. As shown in FIG. 1, client-side 102 installs the driver of iSCSI initiator 110 and connection to virtualization server 101. Storage-side 103 installs the driver of iSCSI target 120 and connection to virtualization server 101. Virtualization server 101 installs virtualization software layer 140 in addition to the drivers of iSCSI initiator and target.

According to the configuration of virtualization software layer 140, the change of the iSCSI packet field may be observed from the view point of iSCSI packet data flow. Initially, iSCSI target 120 of the switch of virtualization server 103 receives the iSCSI packet and unpacks the packet. The packet is then transmitted to SCSI layer 130 for reading the command. Then, virtualization software layer 140 is called to transform into physical access location and generate SCSI access command format. Finally, the SCSI command is packed into an iSCSI packet and transmitted. In this series of translation, iSCSI starts with the initial input packet format, then through the stages of header removed, SCSI command (Command descriptor block, CDB) of payload extracted, SCSI layer access, mapped by virtualization software later to data physical access location, to regenerate SCSI command, and finally adding iSCSI header for transmission.

The input iSCSI packet and the final output iSCSI packet are both iSCSI packets in appearance. However, inside the virtualization switch, a plurality of software layers is required to accomplish the virtualization network storage based on the iSCSI session architecture. The final outputted iSCSI packet goes through repeated data movement, including initial unpacking and final generation.

In the current technology, the storage network virtualization techniques using iSCSI protocol as connections may be divided into the following categories.

The first category is shown in FIG. 2. From the viewpoint of the relation between iSCSI switch 201 and iSCSI host-side 202, the agents managing the storage device are distributed outside of the data path and the transmitted data may reach network storage device 203 without passing through the switch of the storage device. Data, after leaving the host-side, will be transmitted to storage device 203 immediately without redundant protocol processing and data duplication on the data path. However, both host-side and storage-side needs to install iSCSI agent, labeled as 210, 220, for exchanging access messages with the storage server.

For example, in U.S. Pat. No. 6,845,403, the iSCSI protocol access packets are divided into control type and data type. The control-type packets are transmitted from host-side to an access management server, and the server relays the command to the physical storage device. The data-type packets are transmitted through the pre-established iSCSI session between host-side and physical storage-device-side for data transmission so as to achieve the most direct data transmission path. However, the host-side needs to install special iSCSI driver so as to interact with the management server. In addition, when the number of storage devices increases, the iSCSI sessions between host-side and the storage-side also increase.

The second type is shown in FIG. 3. Host-side 302 and storage-side both need iSCSI agent, labeled as 320 and 310. The data is transmitted through switch router 301 to storage-side. The switch router uses the simple lookup table of IP layer 311 to determine the data packet to be transmitted to storage-side 303. Therefore, the data path only includes the IP location translation. However, the host-side needs to install iSCSI agent 320. Also, the access information synchronization is difficult.

For example, in U.S. Pat. No. 6,934,799, when SCSI command is issued, the host-side searches the virtual IP mapping table specific to host-side to find the IP and TCP locations of the iSCSI packet transmission at the same time. The packet is transmitted to the virtualization gateway, and then to physical network access location. The access loading is distributed on the host-side and the physical access location. The transmission of each packet on the data path is preserved, and only simple IP location is replaced. In this manner, when the physical storage device is changed, it is only necessary to change the virtual IP and physical IP mapping on the data gateway, and the packet on the data path only needs to change the fields of IP and TCP location without any redundant data duplication.

However, host-side needs to implement an access control module on top of iSCSI driver so as to join the gateway virtualization access system. It is easy to operate the gateway management between virtual and physical hard disks. However, the modification process of mapping between the block range of the access table on the host-side and the virtual TCP field is complicated and difficult to achieve unified management.

The third type is shown in FIG. 4. iSCSI switch 401 is on the data path between host-side 402 and physical storage-side 403 to accomplish the virtualization network storage design in a stand-alone manner. With iSCSI driver installed, host-side may access data through switch 401. Host-side 402 only requires a general iSCSI initiator 410 to access the network storage provided by switch 401. However, during the transmission on switch 401, data packet needs to go through a plurality of layers of protocol processing and data duplication; therefore, the access efficiency will be reduced.

For example, U.S. Patent Publication No. US2005/0114464 uses a general iSCSI protocol and a virtualization software layer to achieve the virtualization storage network. A relation between the received virtualization location access and physical storage device is found for performing the data path optimization, and the translation between different transmission protocols on the host-side and storage-side may be achieved. However, no details for buffering of transmission data during the protocol translation are disclosed. If a general data buffering technique is used, the access efficiency will be reduced because of the redundant data duplication.

There are in-band and out-of-band methods for the current technologies to realize the virtualization. In the out-of-band method, the virtualization device is located out of the data path so that a high efficiency data transmission path is provided between the host-side and the storage-side. However, when the configuration of the access device is changed, it is more time-consuming to update the virtualization device and communicate with the hosts. Also, the host-side needs to install the software interface communicating with the virtualization device, which is less convenient in terms of direct access to the storage device. In the in-band method, the virtualization device is on the data access path between the host-side and the storage device. Although the management is more convenient after the change of storage group and direct access to the storage device is provided to the host-side, the inquiries of the virtualization device from the host-side share the bandwidth with the physical data transmission path; therefore, the transmission efficiency is reduced.

For the above two methods, the in-band method may be used to achieve virtualization access, and the virtualization server on the data path may independently achieve the translation of the virtual and physical access addresses; the out-of-band method may be used to distribute the virtualization access workload to the virtualization server and the agent on the host-side.

SUMMARY OF THE INVENTION

The disclosed embodiments according to the present invention may provide a packet forwarding apparatus and method for a virtualization switch, applicable to switch environments built by iSCSI sessions. In the disclosed embodiments, the host-side and the storage-side of an iSCSI protocol session may look up an iSCSI session mapping table to forward the packets between the two sides of the session to achieve the data exchange between the host-side and the storage-side.

In an exemplary embodiment, the disclosed is directed to a packet forwarding apparatus for a virtualization switch. In the virtualization switch, a target module at the front end establishes a connection with at least a client, and an initiator module at the rear end establishes connection with at least a storage device. The packet forwarding apparatus may comprise a header extractor, a dispatcher, and a forwarding unit. After completion of the authorization for an iSCSI session, the header extractor receives at least an iSCSI packet and extracts the header for the at least an iSCSI packet. The dispatcher decides the flow directions for the received packets. The forwarding unit forwards the packets between the client-side and the storage-side of the iSCSI session, at least including converting the virtual address into physical address for the received iSCSI packets, building the mapping between the client-side interface and the storage-side interface, and delivering the payload associated with the iSCSI session.

In another exemplary embodiment, the disclosed is directed to a packet forwarding method for a virtualization switch. The method may comprise: extracting the header from each iSCSI packet of one or more packets received in the TCP connection used by an iSCSI session; for each packet of the received one or more packets, determining whether the format of the packet being qualified for forwarding; for each qualified packet, determining whether the packet being iSCSI Cmnd type; if so, translating the virtualization access address information of the packet of iSCSI Cmnd type into a corresponding physical address and adding a new mapping relation to a Dynamic Session Mapping Table (DSMT); from the DSMT, finding a corresponding destination session identifier (ID) and an initiator task tag (ITT) field; according to the connection status of the destination session, modifying the header of the iSCSI packet and transmitting the modified iSCSI header and the iSCSI payload from the source TCP connection.

The disclosed packet forwarding mechanism may also be implemented in a system with multi-processor architecture in addition to the operating system (OS) with TCP protocol capability.

The foregoing and other features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
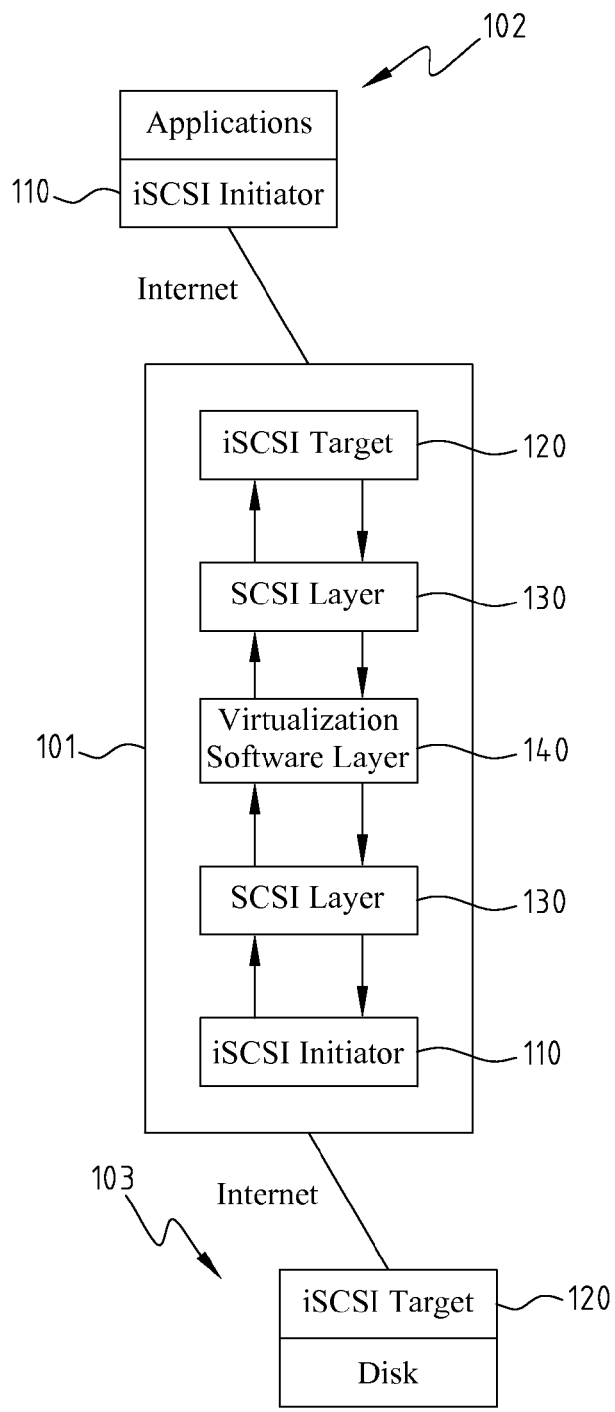
FIG. 1 shows an exemplary schematic view of a typical iSCSI virtual storage network.
Figure 2:
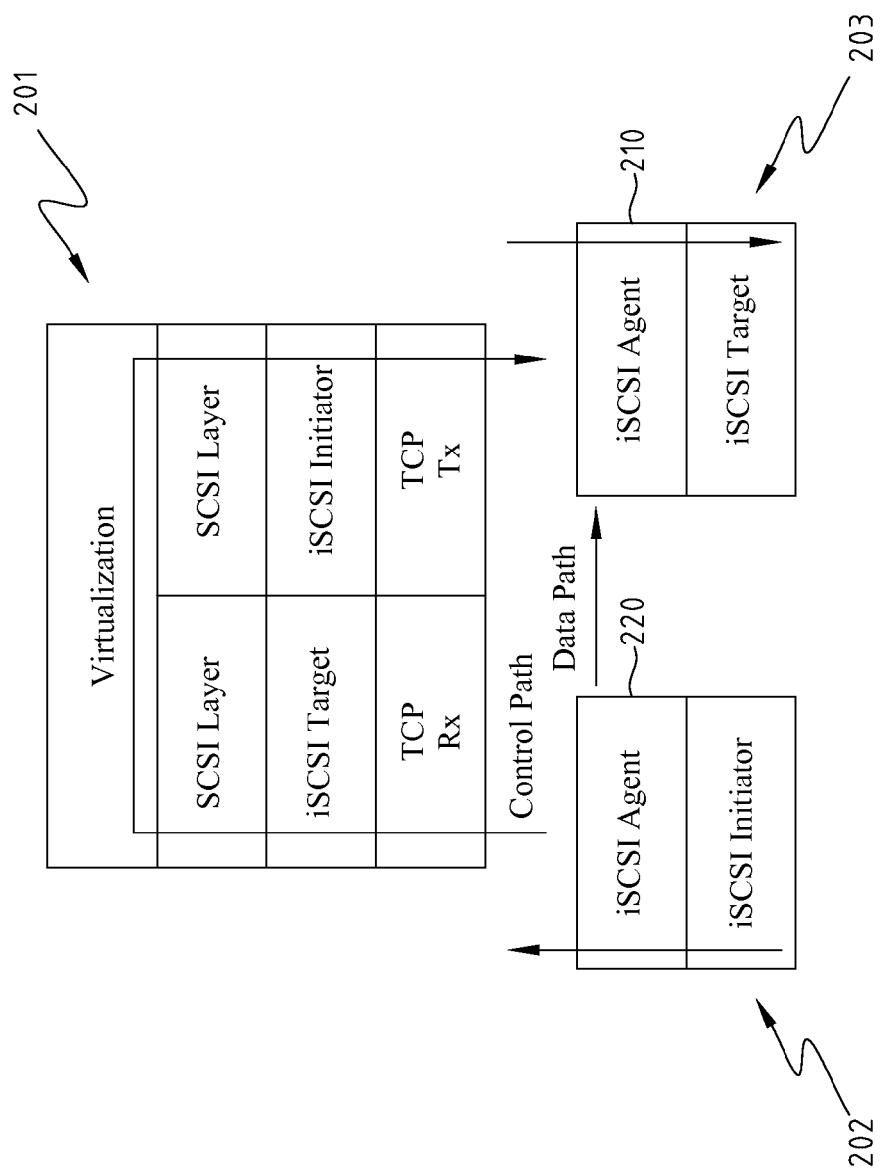
FIG. 2 shows an exemplary schematic view of a technique for achieving a virtualization storage network.
Figure 3:
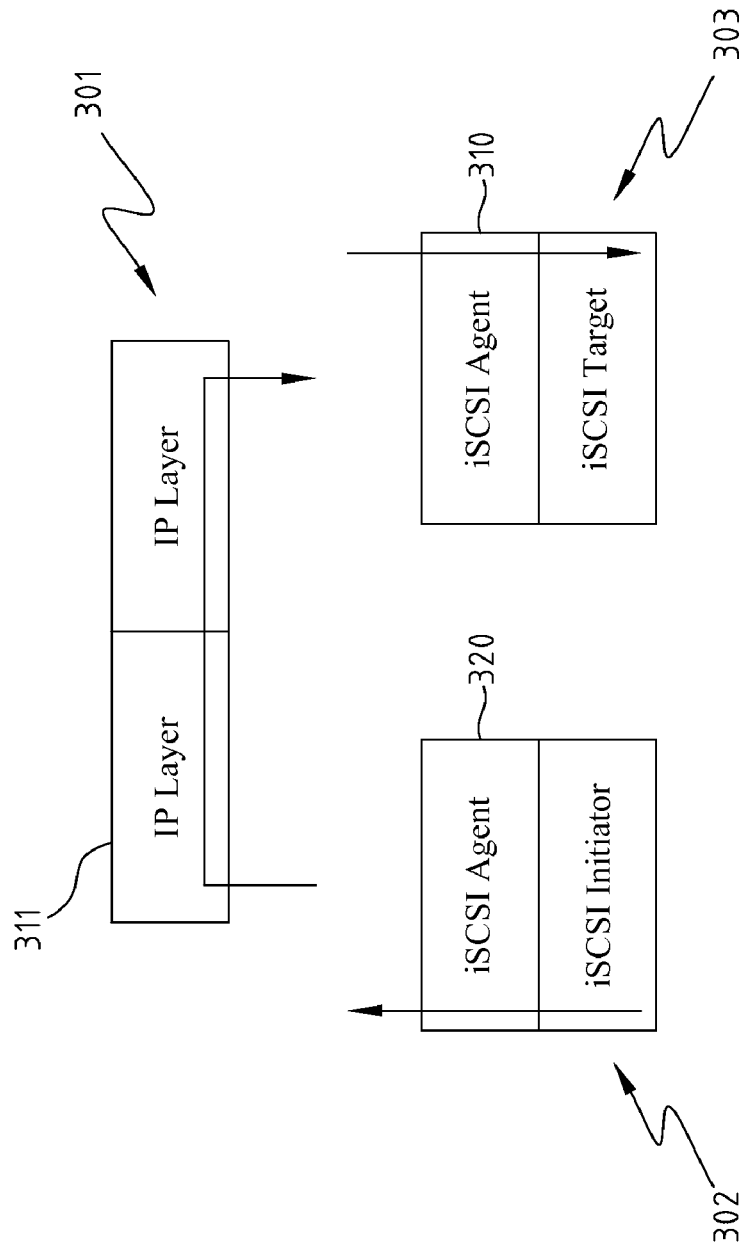
FIG. 3 shows an exemplary schematic view of another technique for achieving a virtualization storage network.
Figure 4:
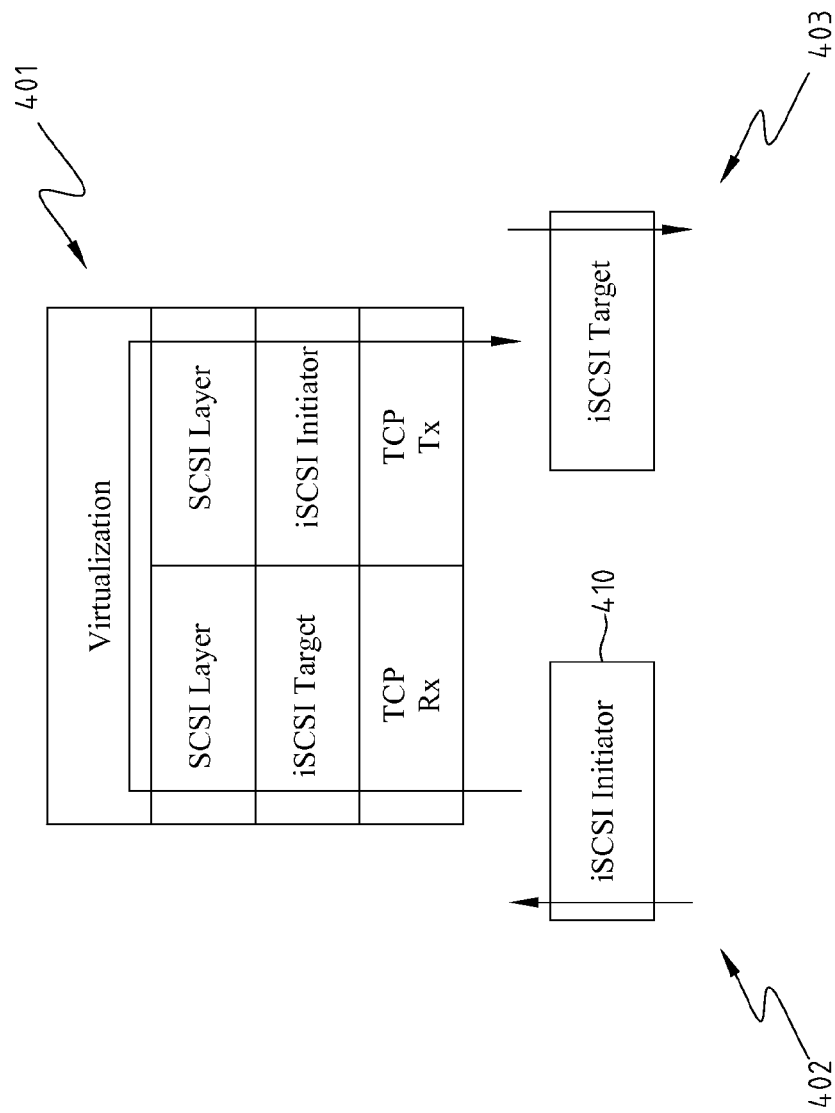
FIG. 4 shows an exemplary schematic view of yet another technique for achieving a virtualization storage network.
Figure 5:
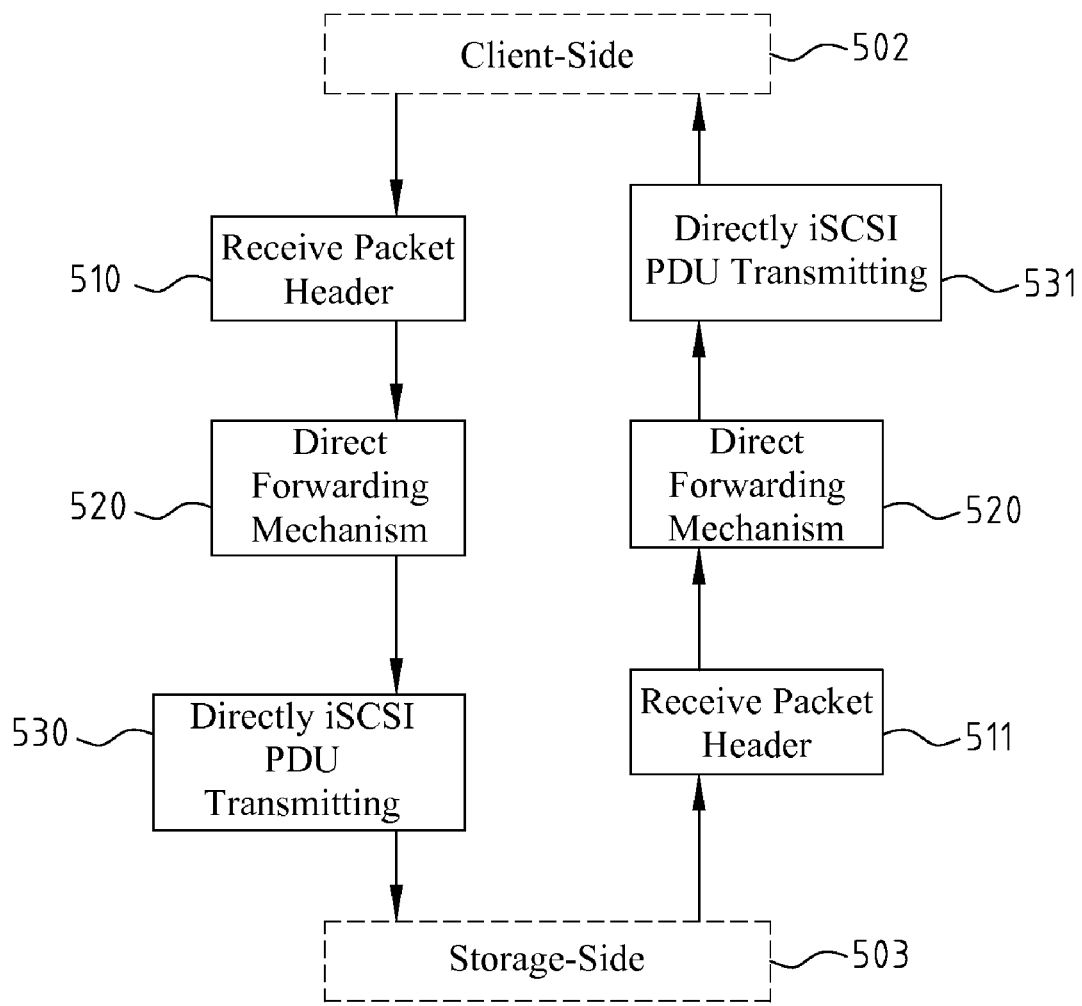
FIG. 5 shows a schematic view of an exemplary flowchart illustrating the direct packet forwarding process of iSCSI protocol data unit (PDU) from client-side to storage-side, consistent with certain disclosed embodiments of the present invention.

The disclosed exemplary embodiments of the present invention provide a direct packet forwarding bridge in a switch environment built with a network protocol, such as iSCSI protocol. The iSCSI packet may be forwarded directly from a client-side to a storage-side without redundant header extraction, reading, address translation, header construction, and so on. FIG. 5 shows a schematic view of an exemplary flowchart illustrating the direct packet forwarding process of iSCSI protocol data unit (PDU) from the client-side to the storage-side, consistent with certain disclosed embodiments of the present invention.

Referring to FIG. 5, as shown in step 510, only the packet header of iSCSI PDU is received for processing during the process from client-side 502 to storage-side 503. In step 520, the corresponding iSCSI session information is found through the direct forwarding mechanism. In step 530, the packet header and its following payload are directly transmitted to storage-side 503. Also, when the iSCSI PDU is returned from storage-side 503 to client-side 502, only the packet header is received from the TCP connection, as shown in step 511, the corresponding session of client-side 502 for the data is found through direct forwarding mechanism 520, and the returned iSCSI PUD is transmitted to client-side 502, as shown in 531.

In other words, the disclosed according to the present invention provides a bridge between the client-side and the storage-side. The connection between the two sides for the bridge is using iSCSI network protocol for connection, i.e. the iSCSI session connection. The method of the bridging is by establishing a table to generate a corresponding one-to-one or one-to-many mapping relation between client-side and storage-side.

After the corresponding mapping is established, the headers of all the PDUs for the iSCSI session are modified, and then, with the payload, directly forwarded to the storage-side. Similarly, from the data returned from the storage-side, the corresponding iSCSI session of the client-side is found by looking up the mapping, and the packet is directly forwarded to the client-side. Cooperated with the existing software layer of the virtualization switch, the disclosed exemplary embodiments of the present invention may still provide the client-side with virtualization storage during the packet forwarding process. In addition, the packet forwarding unit of the disclosed exemplary embodiments, when independent, may achieve better efficiency on multi-processor platforms.

Figure 6:
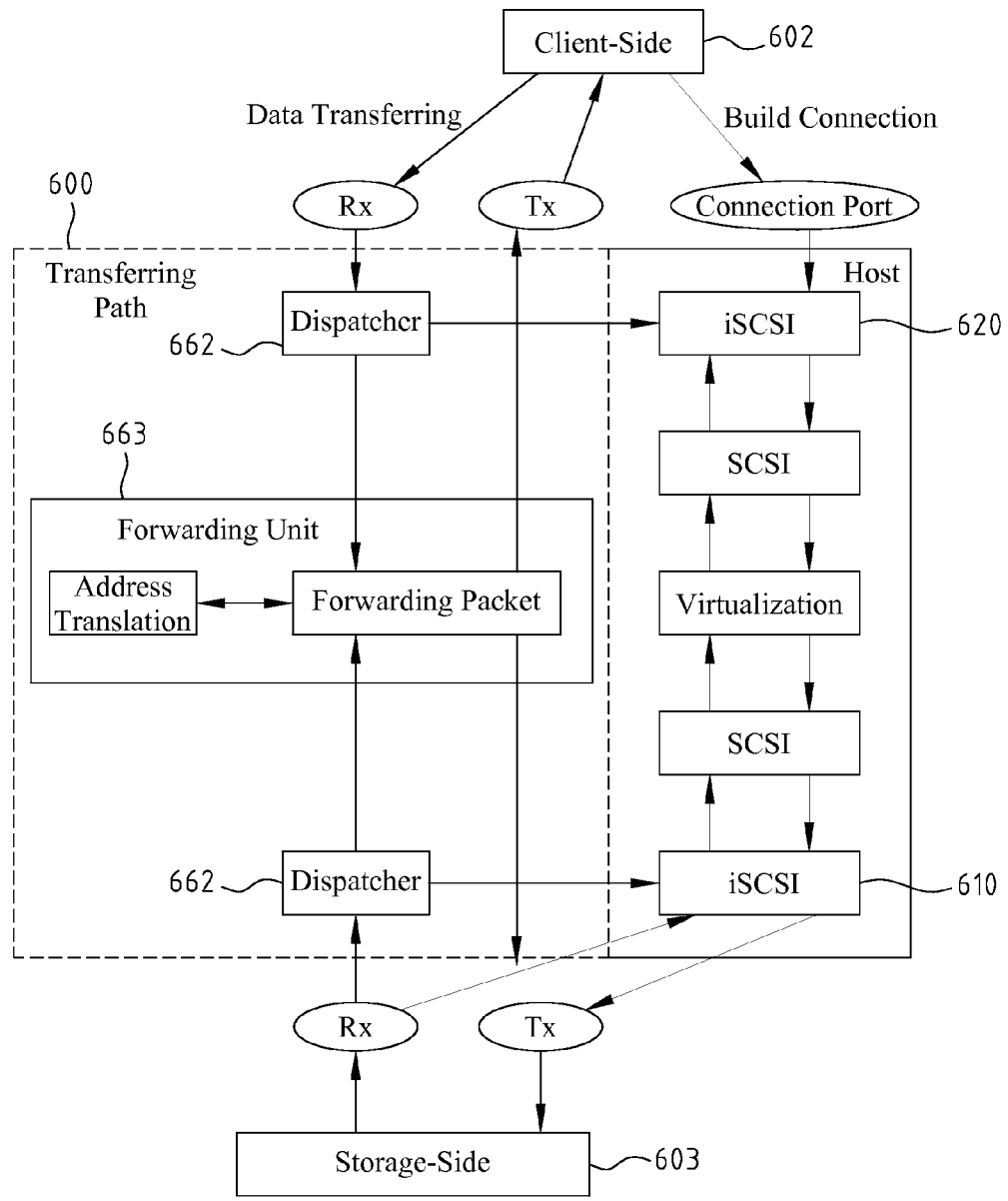
FIG. 6 shows an exemplary schematic view of packet forwarding apparatus for a virtualization switch, consistent with certain disclosed embodiments of the present invention.

FIG. 6 shows an exemplary schematic view of packet forwarding apparatus for a virtualization switch, consistent with certain disclosed embodiments of the present invention. Referring to FIG. 6, in the virtualization switch, the front is a target module, such as iSCSI target 620, which may establish an iSCSI session with at least a client-side 602. The rear is an initiator module, such as iSCSI initiator 610, which may establish an iSCSI session with at least a storage-side 603. Packet forwarding apparatus 600 of the disclosed embodiment comprises a header extractor 661, a dispatcher 662 and a forwarding unit 663.

When the iSCSI session finishes system authentication, header extractor 661 receives at least a packet on the iSCSI session, and extracts the header of the packet. Dispatcher 662 determines the direction of the packet flow. Forwarding unit 663 executes the direct forwarding of the packet between the front (client-side) and the rear (storage-side) with established iSCSI session, including translating the virtual access address of the packet received by dispatcher 662 into physical address, establishing the mapping relation between client-side interface and storage-side interface, such as establishing a mapping relation in a Dynamic Session Mapping Table (DSMT), and transmitting the payload associated with the iSCSI session.

Header extractor 661 may perform data control on a plurality of iSCSI packets on the iSCSI session. By separating iSCSI header from the payload data, the entire packet forwarding process only involves the data processing on the header field of PDU without involving the movement of the data field of PDU.

Figure 7:
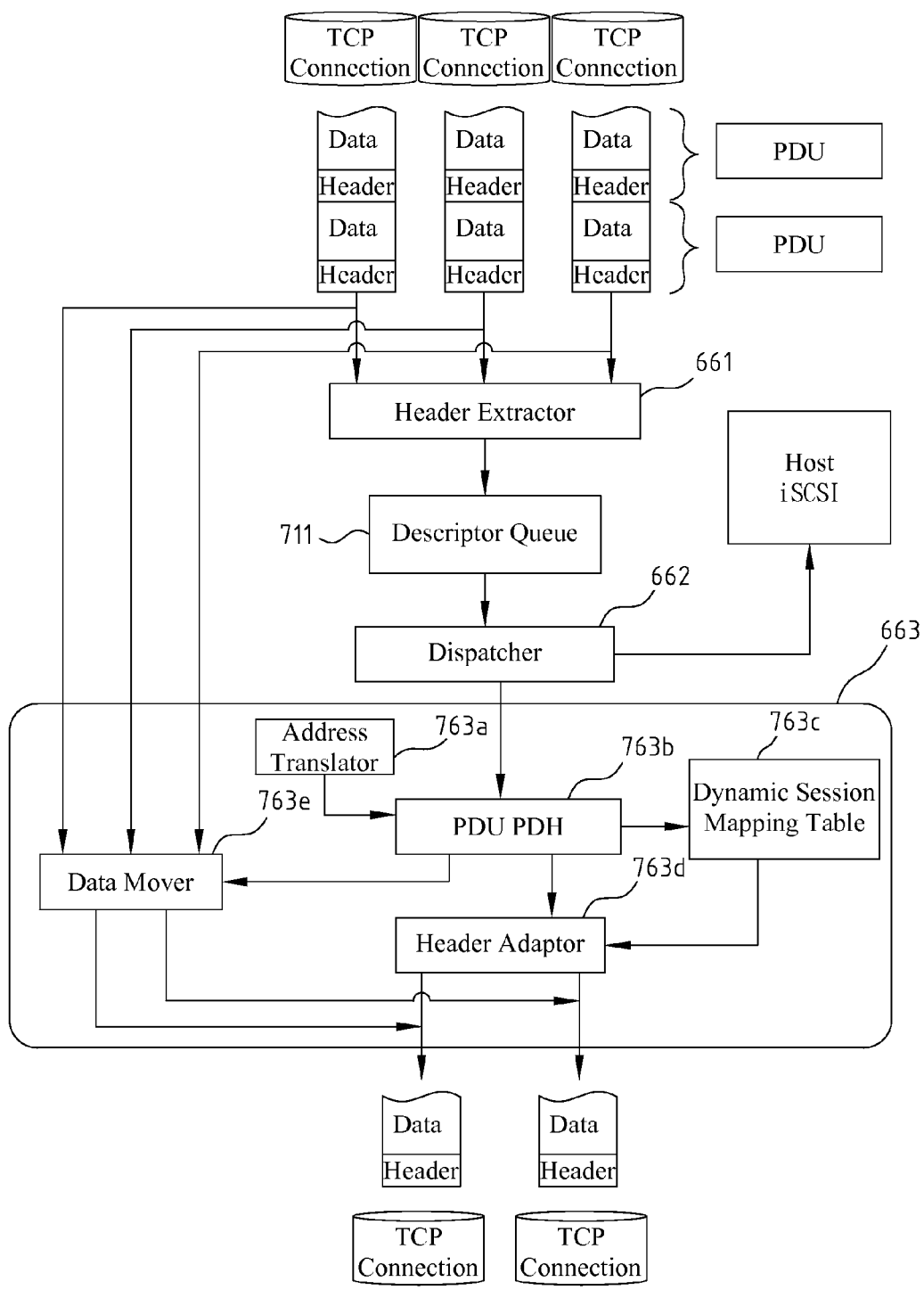
FIG. 7 shows an exemplary schematic view of the operations of each module of the packet forwarding apparatus, consistent with certain disclosed embodiments of the present invention.

Forwarding unit 663 may further include an address translator (AT), a DSMT, a PDU duplication handler (PDH), a header adaptor and a data mover. Packet forwarding apparatus 600 of the disclosed embodiment may further include a descriptor queue. FIG. 7 shows the detailed operations of these modules, consistent with certain disclosed embodiments of the present invention.

Referring to FIG. 7, after system authentication for the iSCSI session, header extractor 661 may find the session ID (denoted as Conn) and virtual access ID (denoted as VIun) from the session information to combine into an access descriptor to be entered into descriptor queue 711 for the next process. Descriptor queue 711 is to separate the receiving of the header from the analysis of the header so that these two tasks may be executed concurrently, and solves the racing problem caused by dispatcher 662 required by a plurality of sessions simultaneously.

When the data enters descriptor queue 711, dispatcher 662 will move a descriptor from descriptor queue 711, and may learn the packet type from the descriptor message and determine whether the packet type is eligible for forwarding. For example, the packet type may be one of iSCSI command (iSCSI Cmnd), iSCSI DataOut, iSCSI DataIn, iSCSI response (iSCSI Rsp) or iSCSI ready-to-transfer (iSCSI R2T). If the packet is of Cmnd type, dispatcher 662 will transmit the packet header to the next unit for further processing. If the packet is of types other than Cmnd, dispatcher 662 will return the packet header and associated payload data to the iSCSI target of the system for processing. Dispatcher 662 may determine whether the packet should be directly sent to forwarding unit 663 for directly forwarding to storage-side 603 or sent to Host iSCSI of the OS.

The function of AT 763a is for the translation between virtual access and physical address. When AT 763a receives VIun, access block and access length, AT 763a may find the physical access address and the session that the physical access address is associated with. In other words, AT 763a may find the mapping relation between session ID and the physical access address from VIun and access location.

The iSCSI packet received from dispatcher 662, with access address translated by AT 763a, learns session ID of the physical access address and the number of the physical storage devices. PDU PDH 763b determines the mapping relation between the source packet and the forwarding packet and establishes the mapping relation in DSMT 763c.

PDU PDH 763b enters the corresponding entry to DSMT 763c. The format of the entries is shown in DSMT 763c. After entering the corresponding entry in DSMT 763c, PDU PDH 763b transmits the packet header to header adaptor 763d. Header adaptor 763d handles the modification and transmission of the fields of iSCSI header. If the header includes associated payload, then the TCP layer of the receiving side is taken as transmission data and sent out on the TCP connection at storage-side through data mover 763e.

PDU PDH 763b may also solve the one-to-many mapping among virtual and physical mappings, which may develop a plurality of physical target accesses when the client-side triggers a virtual target access. Header adaptor 763d may learn the replacement value of the iSCSI field from DSMT 763c, and transmits the header through the TCP connection associated with the iSCSI session. Data mover 763e may take the iSCSI payload remaining on TCP connection as the iSCSI transmission data and send it out.

In this manner, the client-side's access rights to the target and the configuration of a virtualization storage device may be managed collectively on the switch so that the client-side may install the commonly used iSCSI initiator connection software and directly regards the switch as an iSCSI target for access. On the switch, the physical storage devices connected by iSCSI protocol may use the virtualization configuration to provide the client-side access through account/password authorization so that the client-side does not require installing any additional access control software. By using data mover 763e to directly determine the destination of the data transmission, the data receiving stays in the lower-level network layer to reduce the redundant data duplication.

Figure 8:
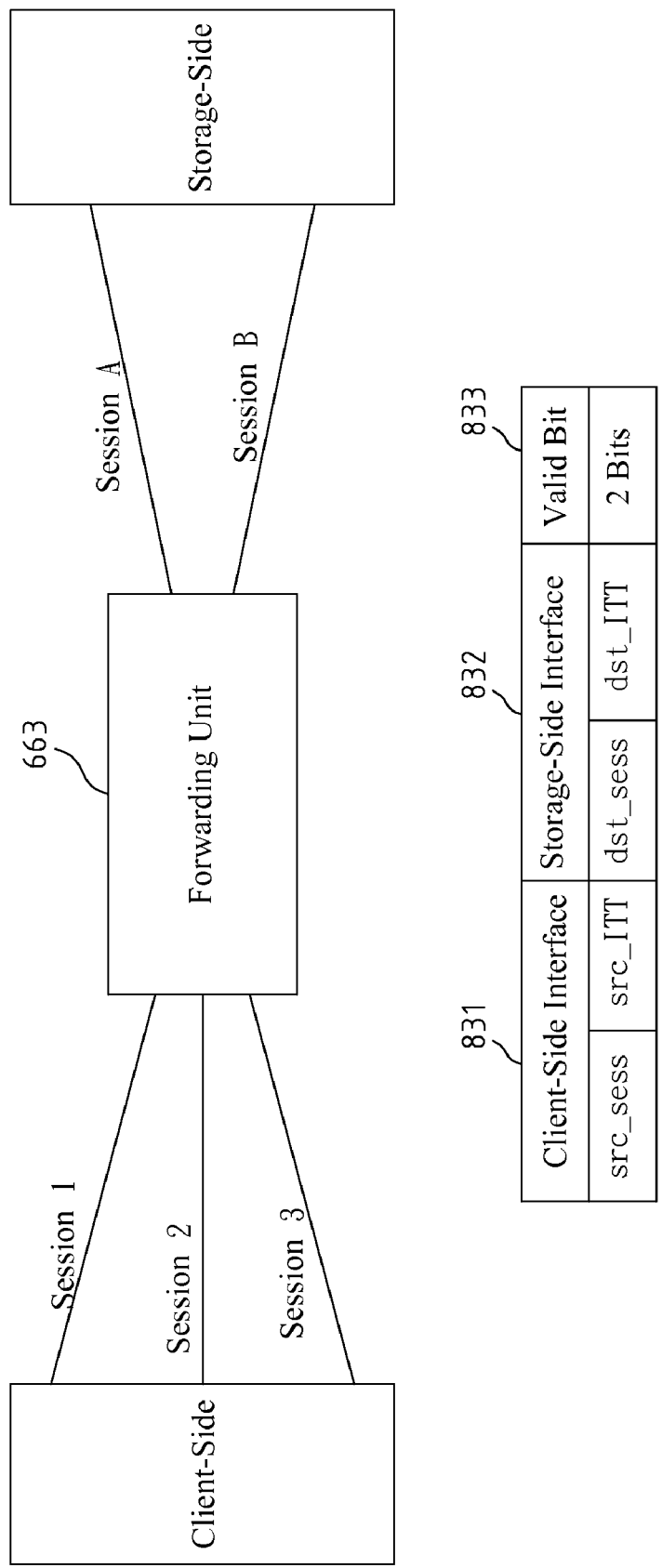
FIG. 8 shows an exemplary schematic view of the contents and the construction of the entries in the DSMT, consistent with certain disclosed embodiments of the present invention.

FIG. 8 shows an exemplary schematic view of the contents and the construction of the entries of the DSMT, consistent with certain disclosed embodiments of the present invention. Referring to FIG. 8, each entry of DSMT 763c may at least include three fields, namely, client-side interface 831, storage-side interface 832 and valid bit 833 for recording respectively the client-side session ID (denoted as src_sess) and initiator task tag (denoted as src_ITT), the storage-side session ID (denoted as dst_sess) and initiator task tag (denoted as dst_ITT), and the access order of the mappings mapped to the same virtualization access. The valid bit is convenient for PDU PDH 763b to manage the iSCSI packets returned from storage-side.

The life span of each entry of DSMT 763c starts with forwarding unit 663 receiving the iSCSI Cmnd PDU of client-side, and ends with forwarding unit 663 receiving the iSCSI Rsp PDU of storage-side. During the lifespan of the entry, the PDUs received from the client-side may be transmitted to the iSCSI storage device of storage-side in one-to-one or one-to-many session manner. Similarly, the data packets returned from the storage devices will use the table lookup manner via forwarding unit 663 to find the client-side which requests the data.

During the construction of the entry, the first iSCSI Cmnd PDU from the client-side to the forwarding unit may learn, through AT 763a, the data in the dst_sess and dst_ITT fields at storage-side, and the valid bit field of the entry records whether the mapping is a one-to-many session mapping. From this point on, when each PDU of the same iSCSI task having the same src_ITT field enters forwarding unit 663, the session and ITT fields of the PDU are used to search DSMT 763c to find corresponding entry in order to find the dst_sess and dst_ITT fields at the destination side until the storage-side returns the last iSCSI Rsp packet, which ends the life span of the entry.

When forwarding unit 663 receives a client-side iSCSI Cmnd PDU and learns the virtual access data is scattered on a plurality of physical storage devices after AT 763a access, forwarding unit 663 needs to transmit accessed iSCSI packets to all the storage devices involved by the access command in addition to performing packet direct forwarding task.

Figure 9:
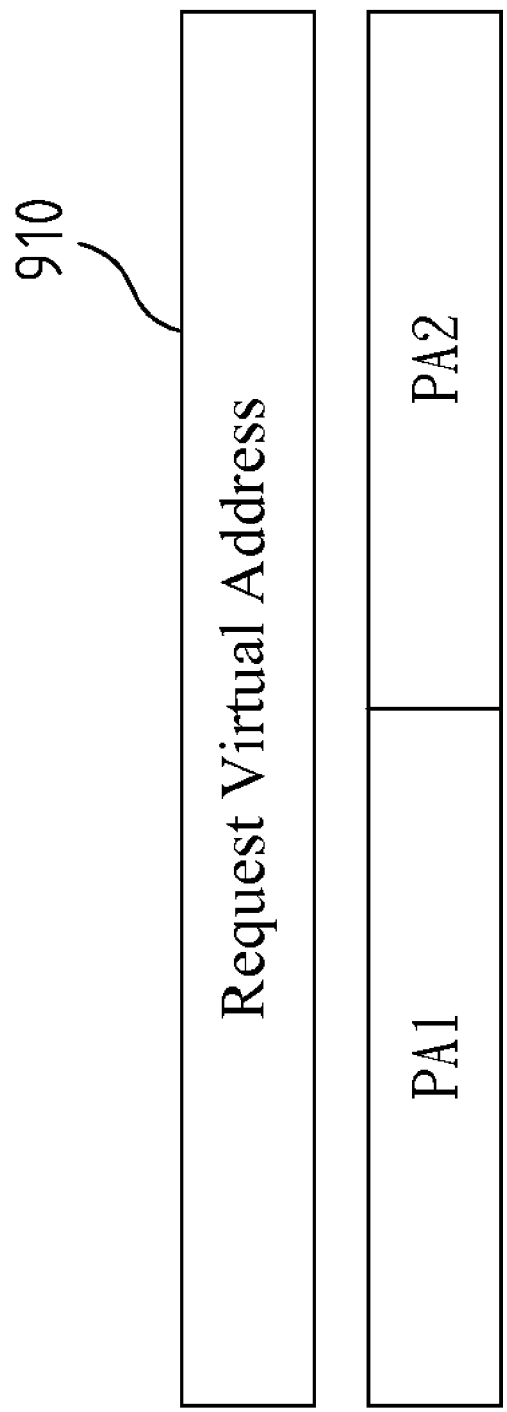
FIG. 9 shows an exemplary schematic view of a virtual address access being mapped to physical storage address distributed on a plurality of physical storage devices, consistent with certain disclosed embodiments of the present invention.

For example, if a request virtual address (VA) 910 issued by a client maps to two physical addresses (PA) PA1, PA2 on two different storage devices, as shown in FIG. 9. When forwarding unit 663 learns from AT 763a that the access targets are scattered on two storage devices, PDU PDH 763b of forwarding unit 663 will construct, according to the number of the targets provided by AT 763a, a plurality of entries in DSMT 763c, with each entry representing the workload of the task that needs to be accomplished by forwarding unit 663 and the storage-side.

Figure 10:
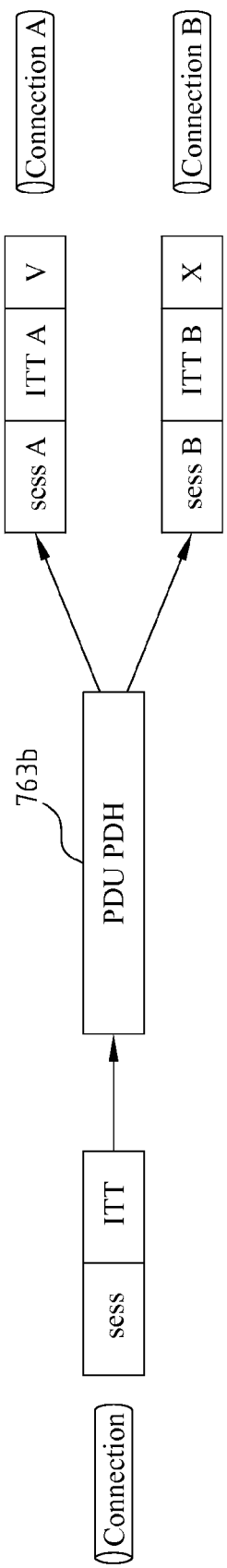
FIG. 10 shows an exemplary schematic view of a valid bit specified in each entry of DSMT, consistent with certain disclosed embodiments of the present invention.

As shown in FIG. 10, during constructing the entries, PDU PDH 763b will mark the valid bit (Vbit) of each entry so that the iSCSI packets return from storage-side may know that whether it is the last access of the multi-task accesses or not. For example, V represents not the last task access, while X indicates the last task access.

Figure 11:
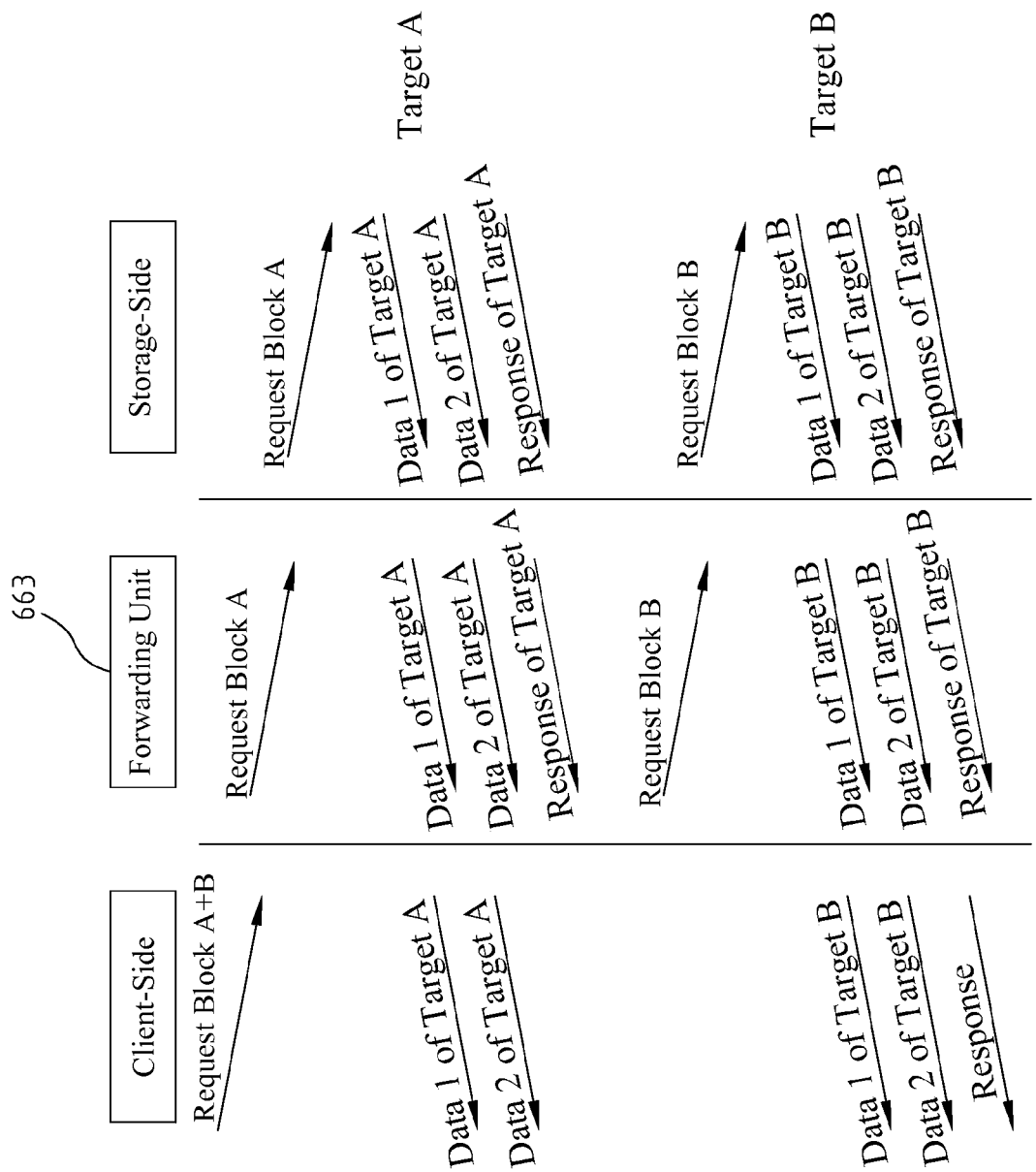
FIG. 11 shows the role of packet regenerator and integrator played by PDU PDH in the packet flow, consistent with certain disclosed embodiments of the present invention.

FIG. 11 further shows the role played by PDU PDH in packet flow as packet integration as well as packet duplication. As shown in FIG. 11, for example, when a user at client-side issues a virtual access request and the physical access block is an A+B packet, where block A is data of target A and block B is the data of target B, forwarding unit 663 will generate respective access packets for the target A and target B at storage-side. The iSCSI data PDU returned from storage-side, after modification of lookup table, will be returned to the user at client-side but the iSCSI Rsp PDU will not be returned to the user at client-side. PDU PDH 763b will return an ISCSI Rsp PDU to the user at client-side only when the last target data access (indicated by Vbit of DSMT 763 entry) involved in the access is transmitted. From the virtual access packet request issued by the user at client-side, through all the returned data packets to the last Rsp PDU received, the user at client-side could not distinguish the multi-target access and the access to a single storage target. Therefore, PDU PDH 763b of forwarding unit 663 may play the role of packet duplication and integration.

Figure 12:
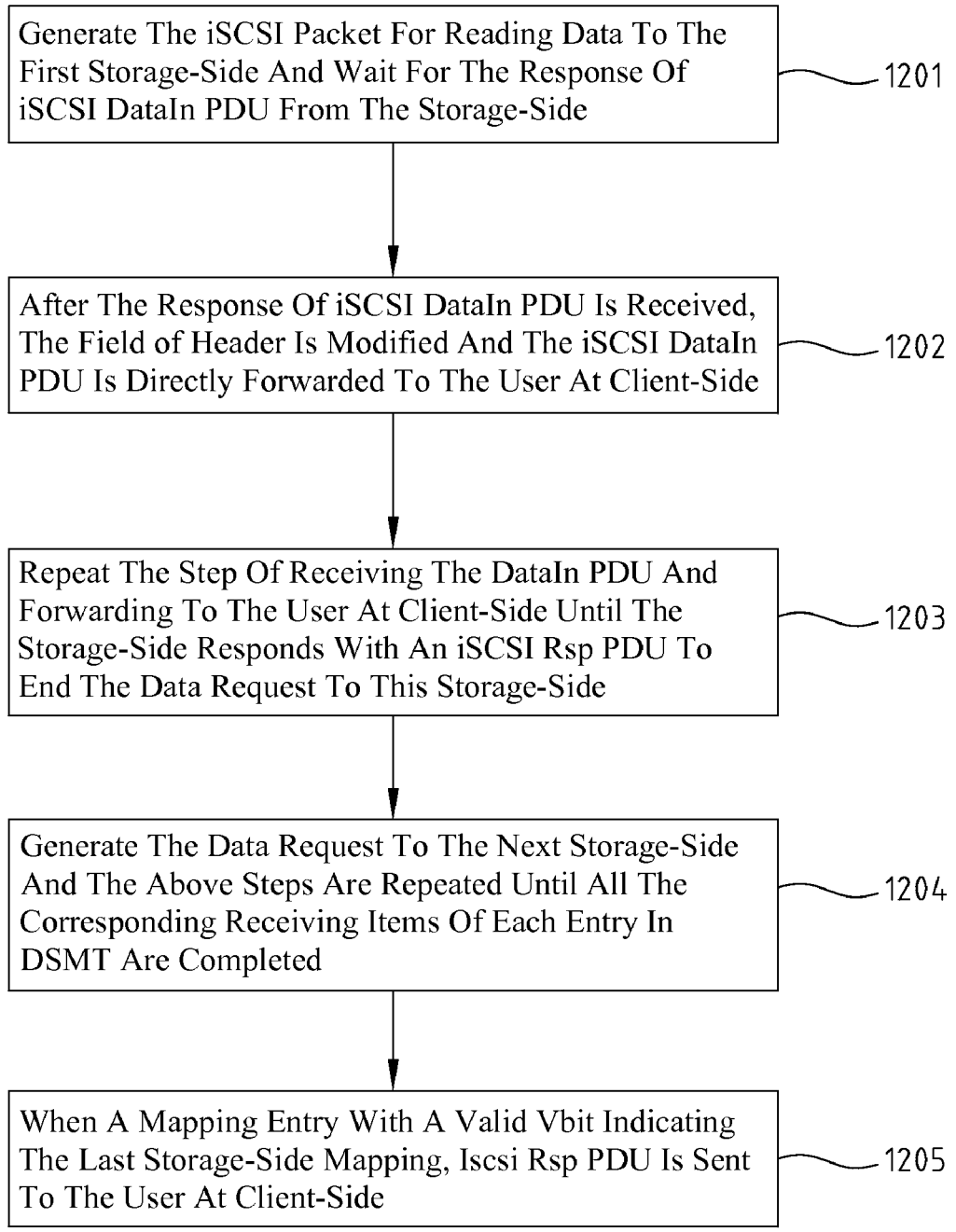
FIG. 12 shows the exemplary flowcharts of how PDU PDH 763b implements the READ commands issued by a client-side, consistent with certain disclosed embodiments of the present invention.
Figure 13:
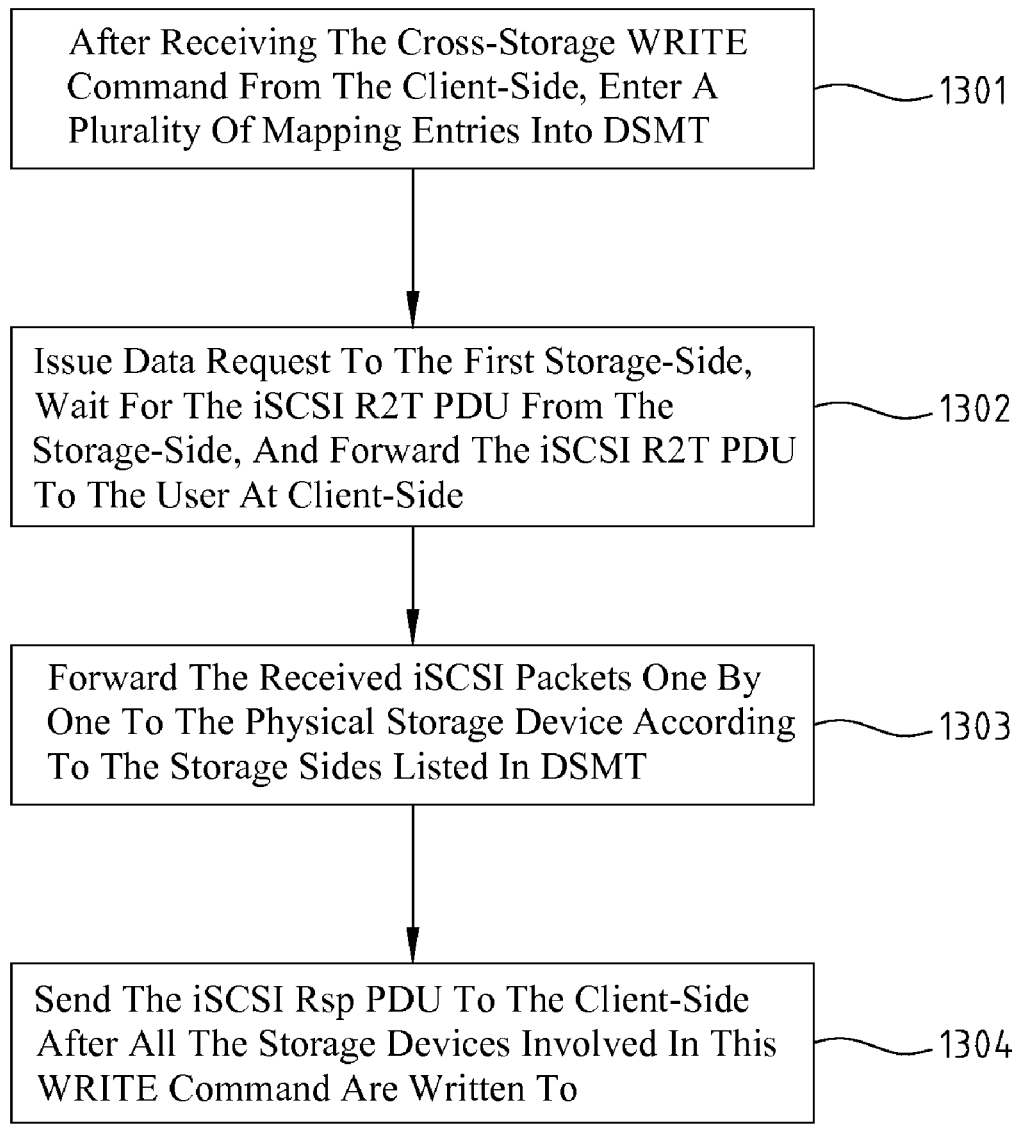
FIG. 13 shows the exemplary flowcharts of how PDU PDH implements the WRITE commands issued by a client-side, consistent with certain disclosed embodiments of the present invention.

FIG. 12 and FIG. 13 show the exemplary flowcharts of how PDU PDH 763b implements the READ/WRITE commands issued by client-side, consistent with certain disclosed embodiments of the present invention.

When a user at client-side issues a READ command, it may learn the number of physical targets of the packet after AT 763a on the iSCSI packet received by forwarding unit 663. PDU PDH 763b constructs the corresponding number of entries in DSMT 763c. From the descriptor of the packet translation by AT 763a, the distribution of the data on the storage devices is known. As shown in FIG. 12, in step 1201, PDU PDH 763b generates the iSCSI packet for reading data to the first storage-side and wait for the response of iSCSI DataIn PDU from the storage-side. In step 1202, after the response of iSCSI DataIn PDU is received, the field of header is modified and the iSCSI DataIn PDU is directly forwarded to the user at client-side. Step 1203 is to repeat the step of receiving the DataIn PDU and forwarding to the user at client-side until the storage-side responds with an iSCSI Rsp PDU to end the data request to this storage-side. Then, the data request to the next storage-side is generated, and the above steps are repeated until all the corresponding receiving items of each entry in DSMT 763c are completed, as shown in step 1204. When a mapping entry with a Vbit indicating the last storage-side mapping, iSCSI Rsp PDU is sent to the user at client-side, as shown in step 1205.

When a user at client-side issues a WRITE command, the operation of PDU PDH 763b is similar to that of the READ command in FIG. 12. The difference is that after the user at client-side issues the WRITE command, the user needs to wait for the ready-to-transfer (R2T) iSCSI packet from the storage-side, and then PDU PDH 763b may start to send the iSCSI DataOut PDU to storage-side. The detailed operation of PDU PDH 763b is shown in FIG. 13.

After PDU PDH 763b receives the cross-storage WRITE command from the client-side, PDU PDH 763b enters a plurality of mapping entries into DSMT 763c according to the instruction of AT 763a, as shown in step 1301. Then, PDU PDH 763b issues data request to the first storage-side, waits for the iSCSI R2T PDU from the storage-side, and forwards the iSCSI R2T PDU to the user at client-side, as shown in step 1302. Forwarding unit 663 starts to receive iSCSI DataOut PDU, and PDU PDH 763b forwards the received iSCSI packets one by one to the physical storage device according to the storage sides listed in DSMT 763c, as shown in step 1303. The iSCSI Rsp PDU is sent to the user at client-side after all the storage devices involved in this WRITE command are written to, as shown in step 1304.

Figure 14:
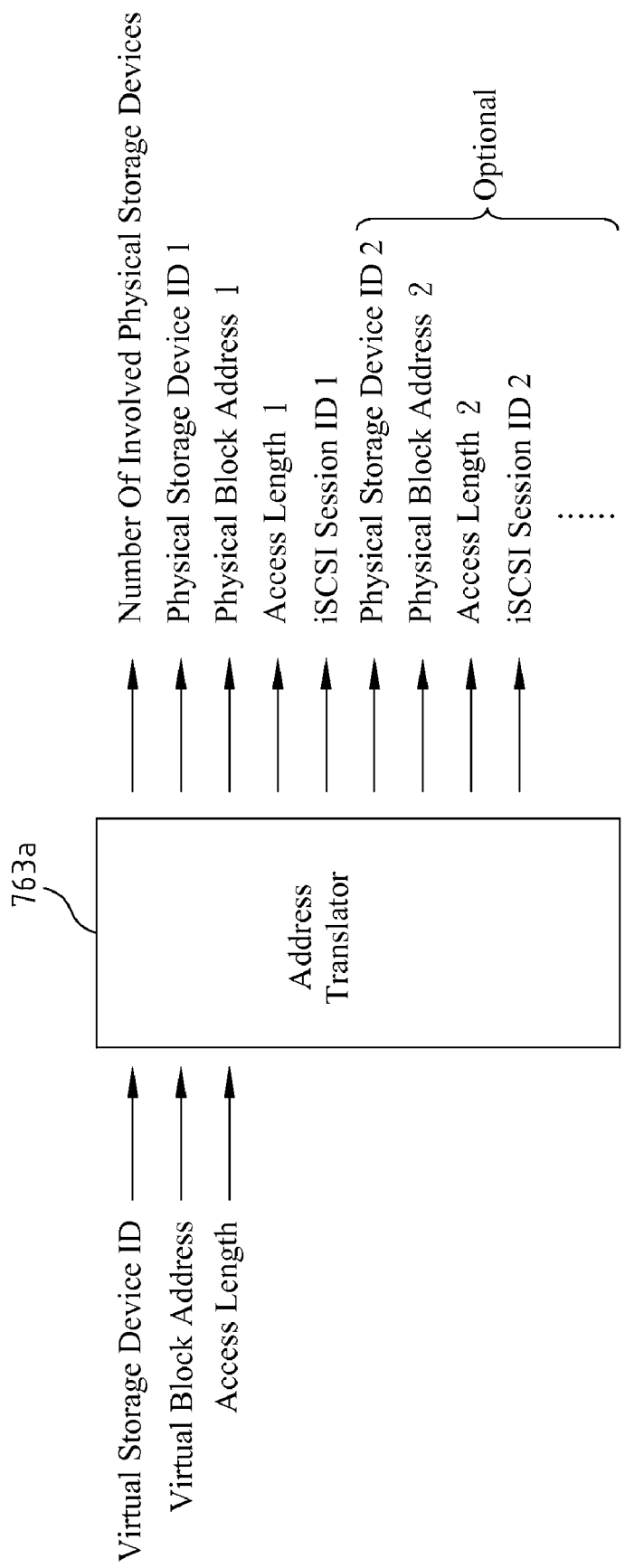
FIG. 14 shows an exemplary schematic view illustrating the input and output parameters of the AT interface, consistent with certain disclosed embodiments of the present invention.

FIG. 14 shows an exemplary schematic view illustrating the input and output parameters of the AT interface, consistent with certain disclosed embodiments of the present invention. As shown in this example, AT 763a may translate the input virtual access information, such as virtual storage ID, virtual block address and access length, to number of involved physical storage devices, and the physical storage device ID, physical block address and access length of each physical storage device, and the iSCSI session ID established by the physical storage device. If the number of the corresponding physical disks is larger than one, there will be a plurality of physical access parameters.

Figure 15:
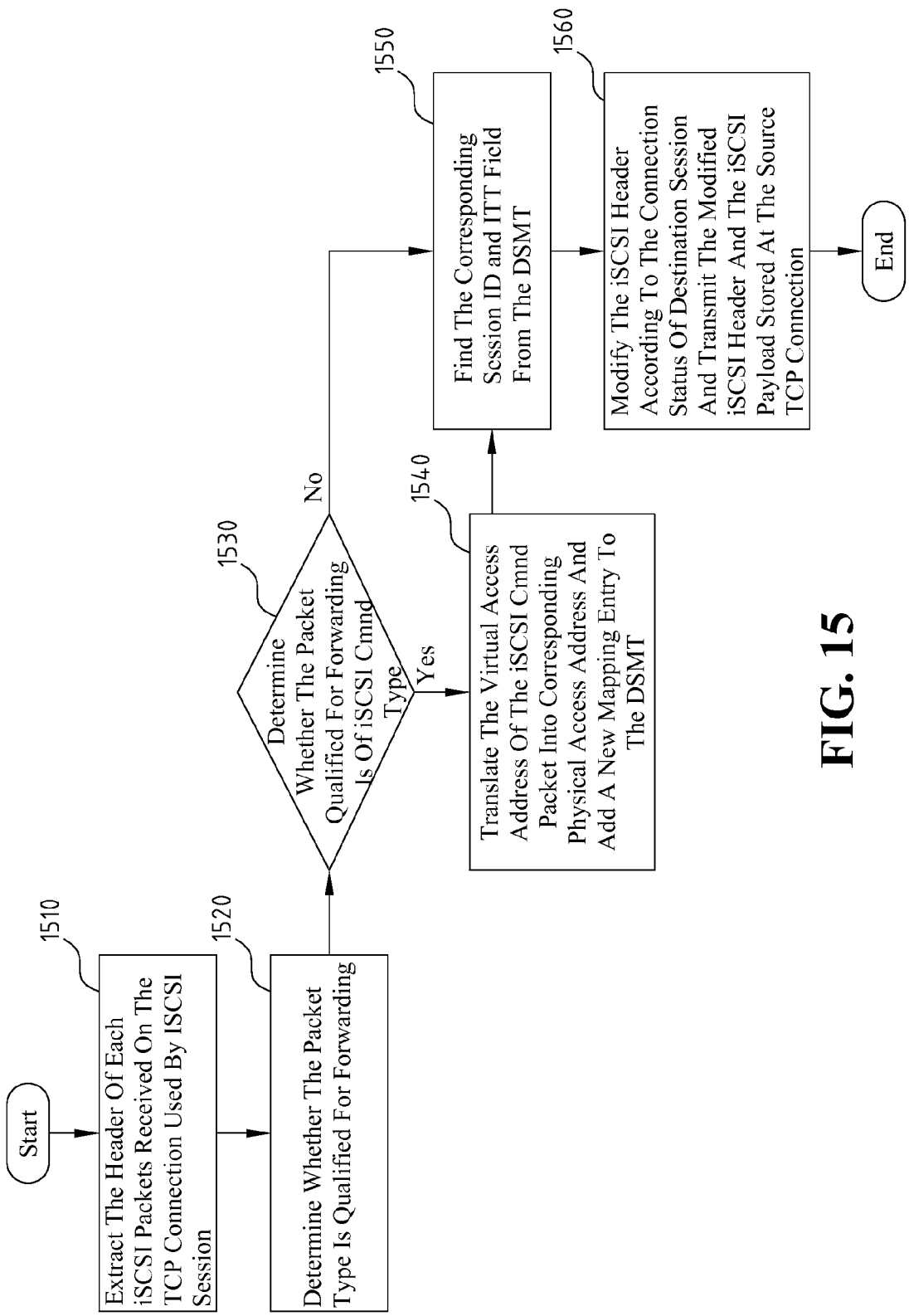
FIG. 15 shows an exemplary flowchart illustrating how a packet is in the process from client-side to storage-side in a virtualization switch environment, consistent with certain disclosed embodiments of the present invention.

FIG. 15 shows an exemplary flowchart illustrating how a packet, such as iSCSI packet, is in the process from client-side to storage-side in a virtualization switch environment, consistent with certain disclosed embodiments of the present invention. In FIG. 15, the disclosed exemplary embodiment uses TCP connection of iSCSI session as the network connection and the iSCSI packet forwarding as packet forwarding.

Referring to FIG. 15, as shown in step 1510, the header of each iSCSI packets received on the TCP connection used by ISCSI session is extracted. Step 1520 is to determine whether the packet type is qualified for forwarding, such as iSCSI Cmnd, iSCSI DataOut, iSCSI DataIn, iSCSI Rsp and iSCSI R2T, and to determine the forwarding direction of the packet. Step 1530 is to determine whether the packet qualified for forwarding is of iSCSI Cmnd type. If so, the virtual access address of the iSCSI Cmnd packet is translated into corresponding physical access address and a new mapping entry is added to the DSMT, as shown in step 1540. For example, the virtual access address information, such as disk ID, address and length, may be obtained from the TCP connection information used by iSCSI session, and the virtual access address information may be translated into physical access address and then added to the DSMT of FIG. 8, followed by step 1550.

For the qualified packets of types other than iSCSI Cmnd, step 1550 is to find the corresponding session ID and ITT field from the DSMT. For example, the src_sess and src_ITT field of the packet may be used to find the corresponding dst_sess and dst_ITT fields in DSMT.

In step 1560, it is to modify the iSCSI header according to the connection status of destination session and transmit the modified iSCSI header and the iSCSI payload stored at the source TCP connection. For example, the ITT and CmdSN fields of the packet may be replaced according to the iSCSI session data structure of destination connection, and then the modified iSCSI header and the iSCSI payload remaining at the source TCP connection may be transmitted to the destination according to the TCP connection used by destination session.

In this manner, when comparing the iSCSI packet received by the switch target and the iSCSI packet transmitted by the switch initiator, the format of the iSCSI packet received by the target will generate the same iSCSI format for transmitting packet to the destination by the initiator. In other words, both iSCSI headers will have the same opcode. Except the destination of the packet and different iSCSI sessions having minor difference in the iSCSI header fields, all the other fields described in the header fields will remain the same.

Because the data received by the switch will be completely transmitted to the destination after the virtualization software layer finds the physical storage address, from the point of view of the input iSCSI packet and the output iSCSI packet, the disclosed embodiments may successfully receive iSCSI packet from the target, replace the corresponding fields, generate iSCSI packet suitable for the initiator to transmit. Therefore, the redundant packet decomposition and translation among the many software layers may be omitted.

Figure 16B:
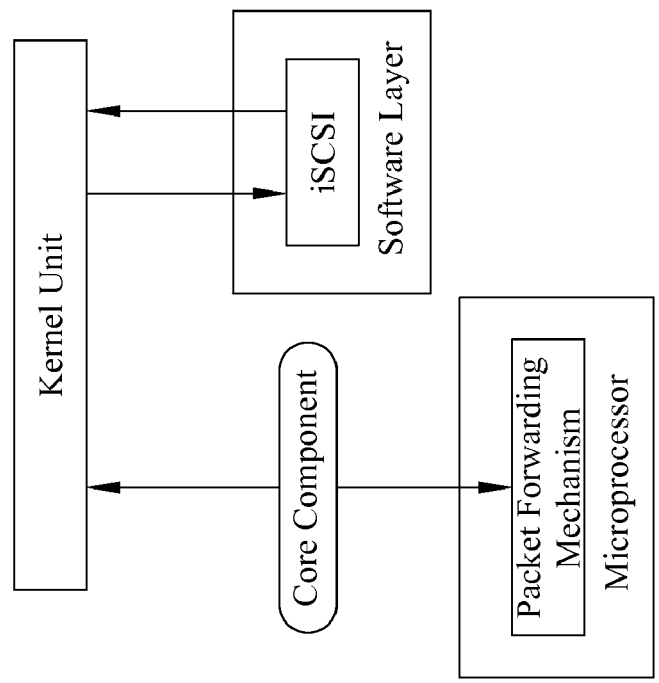
FIG. 16B shows an exemplary schematic view of the relation among iSCSI, packet forwarding mechanism and kernel on a multi-processor system, consistent with certain disclosed embodiments of the present invention.
Figure 16A:
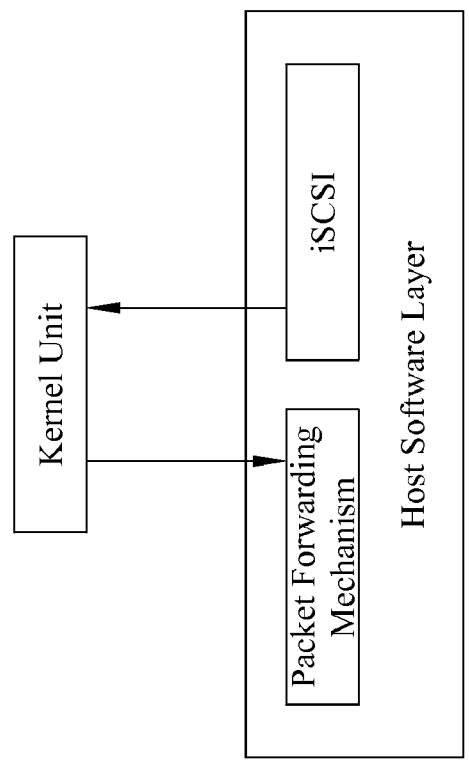
FIG. 16A shows an exemplary schematic view of the relation among iSCSI, packet forwarding mechanism and kernel on a single-processor system, consistent with certain disclosed embodiments of the present invention.

The packet forwarding mechanism may be implemented on a system with a single-processor or a multi-processor architecture. FIG. 16A and FIG. 16B show the exemplary schematic view of the relation among iSCSI, packet forwarding mechanism and kernel on a single-processor and a multi-processor system respectively, consistent with certain disclosed embodiments of the present invention.

Referring to FIG. 16A, in a single-process system, the working example executes iSCSI and packet forwarding mechanism in the software layer of host. Referring to FIG. 16B, in a multi-processor system, the working example uses the main processor to execute the kernel unit and the iSCSI software layer, while the packet forwarding mechanism is executed by the MicroEngine (ME) other than the main processor. A special core component may be used for the data exchange between the procedure on the MicroEngine and the software modules on the main processor.

Figure 17:
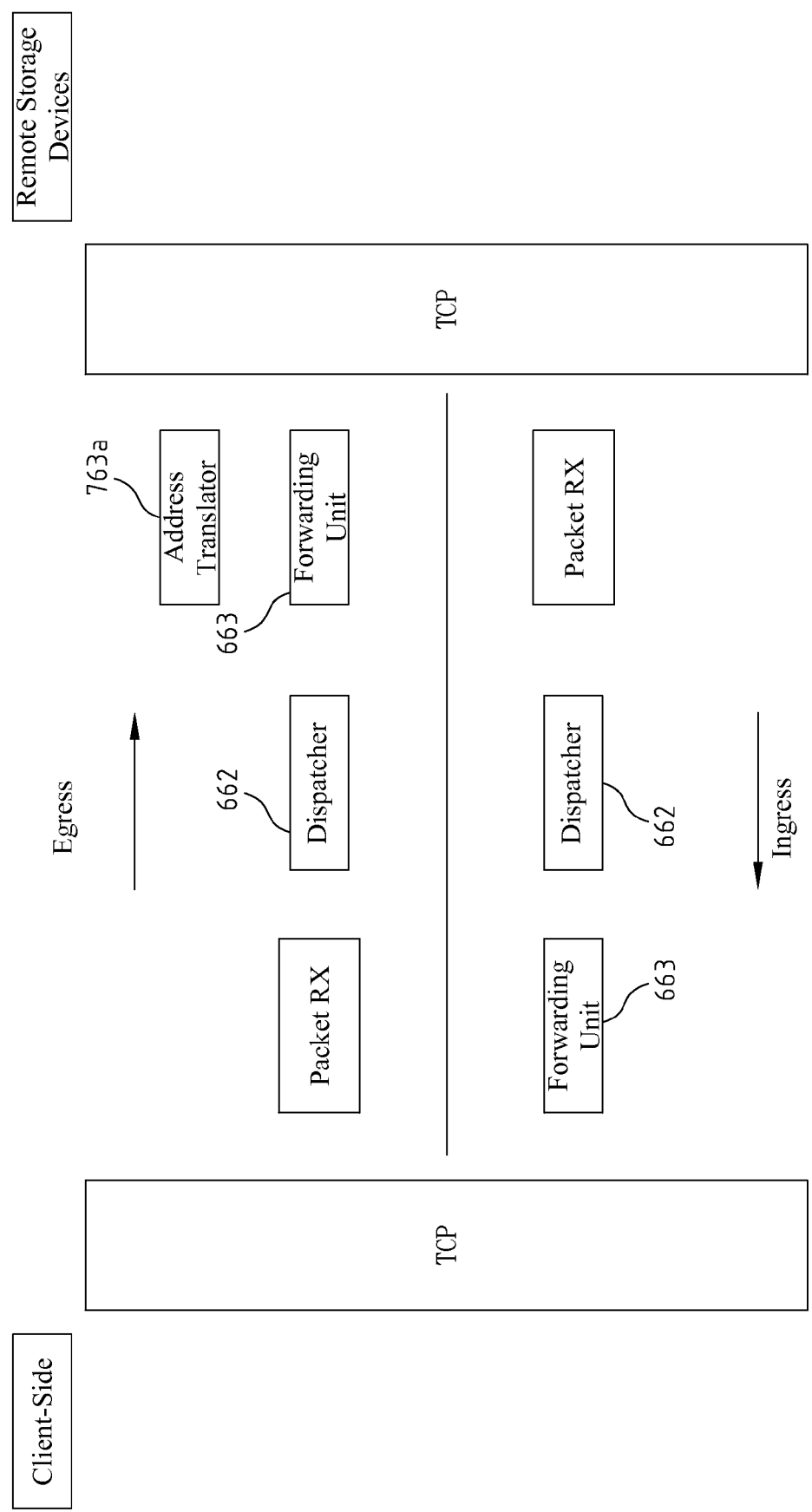
FIG. 17 shows an exemplary schematic view of executing different modules of packet forwarding mechanism on different microprocessors on a multi-processor system, consistent with certain disclosed embodiments of the present invention.

In the working example of the multi-processor system, one way to realize is to distribute the modules of the packet forwarding apparatus of FIG. 7 to independent microprocessors for execution, as shown in the working example of FIG. 17. Each independent microprocessor has its own space for local variable access as well as shares the access location of SRAM. In addition, each microprocessor has its own program counter so that each microprocessor may concurrently execute. The communication among microprocessors may be through special communication channel and the storage space of the hardware architecture may provide data transmission or message notification among microprocessors. With the independent module, the advantage is that the disclosed embodiments of the present invention may be realized on a multiprocessor system and a plurality of modules may concurrently operate as well as reduce the loading on the main processor. This will greatly improve the transmission efficiency of iSCSI PDU on a virtualization switch.

Therefore, the packet forwarding mechanism of the disclosed embodiments may be realized in several ways, such as software, hardware, on a single-processor system or a multi-processor platform.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A packet forwarding apparatus for a virtualization switch, said virtualization switch having a target at a front end establishing front connection with at least a client, and an initiator at a rear end establishing rear connection with at least a storage device, said packet forwarding apparatus comprising:
    a header extractor for receiving a packet from said front connection and extracting a header from said packet;
    a dispatcher for determining a flow direction for said packet; and
    a forwarding unit for forwarding said packet between said front connection and said rear connection;
    wherein said forwarding unit includes:
        an address translator for translating a virtual access address of said packet from said dispatcher into a physical address;
        a dynamic session mapping table having a plurality of entries describing mapping relations between a plurality of source packets and a plurality of forwarded packets, each of said plurality of entries including a client-side interface field, a storage-side interface field and a valid bit field;
        a protocol data unit duplication handler for transmitting said header of said packet from said dispatcher after a corresponding entry has been entered in said dynamic session mapping table;
        a header adaptor for modifying fields of said header of said packet and transmitting the modified header; and
        a data mover taking a payload remaining on said front connection as transmission data and sending said transmission data out.

2. The apparatus as claimed in claim 1, wherein said front connection and said rear connection are connections using Internet Small Computer System Interface (iSCSI) protocol of an iSCSI session, said target is an iSCSI target and said initiator is an iSCSI initiator.

3. The apparatus as claimed in claim 2, wherein said client-side interface field records a client-side session identifier and a client-side initiator task tag, said storage-side interface field records a storage-side session identifier and a storage-side initiator task tag, and said valid bit field records an access order mapped to a same virtual access.

4. The apparatus as claimed in claim 1, wherein said header extractor generates a descriptor for said packet, said descriptor including information of a corresponding session identifier and a virtual access identifier.

5. The apparatus as claimed in claim 1, wherein said dispatcher learns a packet type from said header of said packet and determines whether said packet is qualified for forwarding.

6. The apparatus as claimed in claim 5, wherein said packet type is one of command, DataOut, DataIn, response and ready-to-transfer.

7. The apparatus as claimed in claim 1, said packet forwarding apparatus is realized by either software or hardware on either a single-processor platform or a multi-processor platform.

8. A packet forwarding method for a virtualization switch, said virtualization switch having a target at a front end establishing front connection with at least a client, and an initiator at a rear end establishing rear connection with at least a storage device, said packet forwarding method comprising the steps of:
    receiving at least one packet from said front connection and extracting a header from each packet of said at least one packet;
    checking a packet type from the header of each packet to determine whether the packet is a qualified for forwarding;
    forwarding the packet using the following steps if the packet is qualified for forwarding and has a packet type which is a command type;
    translating a virtual access address of the packet into a physical address;
    entering a new mapping relation entry into a dynamic session mapping table (DSMT);
    searching said DSMT to find a corresponding storage-side session identifier and a storage-side initiator task tag field for the packet; and
    modifying the header of the packet and transmitting the modified header and a payload remaining on said front connection;
    wherein the step of translating a virtual access address of the packet into a physical address includes translating information of a virtual access identifier, a virtual block address and an access length into associated physical storage devices and physical storage device identifiers, a physical block address and an access length of each physical storage device, and an Internet Small Computer System Interface (iSCSI) session identifier established by the physical storage device.

9. The method as claimed in claim 8, wherein the packet qualified for forwarding has a packet type selected from one of command, DataOut, DataIn, response and ready-to-transfer.

10. The method as claimed in claim 8, wherein if the packet has a READ command type, said packet forwarding method further includes:
    generating a read data request to a first storage-side and waiting for said first storage-side to respond with a DataIn protocol data unit (PDU);
    modifying a field of the header of the packet and directly forwarding said DataIn PDU to a corresponding client-side after receiving said DataIn PDU;
    repeating the steps of receiving a DataIn PDU and directly forwarding the DataIn PDU to said corresponding client-side until a response PDU is returned from said first storage-side, and finishing said read data request to said first storage-side; and
    generating a read data request to a next storage-side and repeating the above steps to finish all corresponding receiving items of each entry in said DSMT until a response PDU from a last storage-side is transmitted to the corresponding client-side of said last storage-side, said last storage-side having a mapping entry with a valid bit field indicating a last storage-side mapping in said DSMT.

11. The method as claimed in claim 8, wherein if the packet has a WRITE command type, said packet forwarding method further includes:

entering at least one mapping entry of at least one storage item into said DSMT via an address translation;

issuing a data request to a first storage-side and waiting for a returned ready-to-transfer protocol data unit (PDU), and then transmitting said ready-to-transfer PDU to a corresponding client-side;

forwarding received packets one by one to at least a physical storage device according to the storage items listed in said DSMT; and responding with a response PDU to said corresponding client-side until all physical storage devices associated with said WRITE command are written.

12. The method as claimed in claim 8, wherein said front connection and said rear connection are connections using iSCSI protocol of an iSCSI session, said target is an iSCSI target, and said initiator is an iSCSI initiator.

13. The method as claimed in claim 12, wherein said DSMT includes at least one entry, and life span of each of said at least one entry starts with receiving an iSCSI command PDU from a client-side and ends with receiving an iSCSI response PDU from a storage-side.

14. The method as claimed in claim 13, wherein during the life span of each of said at least one entry, all PDUs received from said client-side are transmitted to iSCSI storage devices of a destination in a way of either one-to-one or one-to-many sessions.

15. The method as claimed in claim 8, wherein the packet qualified for forwarding has a packet type selected from one of command, DataOut, DataIn, response and ready-to-transfer.

16. The method as claimed in claim 8, wherein modifying the header of the packet is based on connection status of an associated destination session.

17. The method as claimed in claim 8, wherein the header of the packet has a corresponding access descriptor, said access descriptor including information of a corresponding session identifier and a virtual access identifier.

18. The method as claimed in claim 8, said packet forwarding method is executed by a host software layer of a single processor.

19. The method as claimed in claim 8, wherein the steps of said packet forwarding method are distributed and executed on at least a microprocessor other than a main processor of a multi-processor system.

* * * * *